US012297960B1

(12) United States Patent
Klebanoff et al.

(10) Patent No.: US 12,297,960 B1
(45) Date of Patent: May 13, 2025

(54) FLOW ASSIST VENT MAST

(71) Applicant: National Technology & Engineering Solutions of Sandia, LLC, Albuquerque, NM (US)

(72) Inventors: Leonard E. Klebanoff, Dublin, CA (US); Myra L. Blaylock, Livermore, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 257 days.

(21) Appl. No.: 17/830,572

(22) Filed: Jun. 2, 2022

(51) Int. Cl.
*F17C 13/04* (2006.01)
*F17C 13/12* (2006.01)

(52) U.S. Cl.
CPC ............ *F17C 13/04* (2013.01); *F17C 13/123* (2013.01); *F17C 2205/0323* (2013.01); *F17C 2205/0352* (2013.01); *F17C 2209/22* (2013.01); *F17C 2221/012* (2013.01); *F17C 2227/01* (2013.01); *F17C 2260/042* (2013.01); *F17C 2270/0105* (2013.01)

(58) Field of Classification Search
CPC ........ F17C 2260/042; F17C 2270/0105; F17C 2205/0323; F17C 2205/0352; F17C 2209/22; F17C 13/04; F17C 13/123; B63J 2/08
See application file for complete search history.

(56) References Cited

U.S. PATENT DOCUMENTS 3,941,145 A * 3/1976 Morain .................... F16L 41/04 137/460
11,993,454 B2 * 5/2024 Bingham .................. A62C 4/00
2007/0215623 A1 * 9/2007 Riviezzo ................... B63J 2/02 220/562

(Continued)

FOREIGN PATENT DOCUMENTS

FR 3109896 A1 * 11/2021
KR 20140079900 A * 6/2014
KR 101532035 B1 * 6/2015

(Continued)

OTHER PUBLICATIONS

Translation FR3109896A1 retrieved from espacenet.com (Year: 2024).*
Translation KR101894010b1 retrieved from espacenet.com (Year: 2024).*
Translation kr20140079900a retrieved from espacenet.com (Year: 2024).*
Blaylock, et al., "Hydrogen Gas Dispersion Studies for a Fuel Cell Vessel", Retrieved at <<https://energy.sandia.gov/wp-content/uploads/dlm_uploads/2022/02/Final-Version-of-Gas-Dispersion-Final-Report_SAND2022-1275-O.pdf>>, Jan. 2022, pp. 1-116.

(Continued)

*Primary Examiner* — Jessica Cahill
(74) *Attorney, Agent, or Firm* — Calfee, Halter & Griswold LLP; Samantha Updegraff; Kenneth Paul McNeill

(57) ABSTRACT

A venting system includes a vent valve in an opening of a storage tank, a carrier gas source for supplying a carrier gas, and a Vent Mast that has a Vent Mast outlet. The Vent Mast has a vent tube and a carrier gas tube. The vent tube extends from a proximal end connected to an outlet of the vent valve to a distal end in the Vent Mast outlet. The carrier gas tube extends from a proximal end connected to the carrier gas source to a distal end in the Vent Mast outlet. Vent gas flows through a vent gas lumen formed by the vent tube and carrier (Continued)

gas flows through a carrier gas lumen formed by the carrier gas tube. The carrier gas dilutes the vent gas and moves the vent gas higher (and thus away) from people and ignition sources.

14 Claims, 9 Drawing Sheets

(56) References Cited

U.S. PATENT DOCUMENTS

| | | | | |
|---|---|---|---|---|
| 2018/0312235 | A1* | 11/2018 | Xu | F02M 21/0218 |
| 2023/0081154 | A1* | 3/2023 | Noh | B63H 21/38<br>62/48.2 |

FOREIGN PATENT DOCUMENTS

| | | | | | |
|---|---|---|---|---|---|
| KR | 101894010 | B1 | * | 9/2018 | |
| KR | 102026052 | B1 | * | 9/2019 | |
| WO | WO-2019185968 | A1 | * | 10/2019 | |
| WO | WO-2020182308 | A1 | * | 9/2020 | B63H 21/17 |
| WO | WO-2021028104 | A1 | * | 2/2021 | F17C 1/00 |
| WO | WO-2023233479 | A1 | * | 12/2023 | |

OTHER PUBLICATIONS

Blaylock, et al., "Informing Hazardous Zones for On-Board Hydrogen Liquid and Gas Systems", In Proceedings of the 4th ASME/USCG Workshop on Maritime Technology and Standards, Oct. 16-17, 2017, pp. 1-19.

Blaylock, et al., "Informing Hazardous Zones for On-board Maritime Hydrogen Liquid and Gas Systems", Retrieved at <<https://energy.sandia.gov/wp-content/uploads/2018/01/SFBreeze_SAND2018-0585_Blaylock.pdf>>, Jan. 2018, pp. 1-50.

Cao, et al., "Safety Design Analysis of a Vent Mast on a LNG Powered Ship during a Low-Temperature Combustible Gas Leakage Accident", In Journal of Ocean Engineering and Science, vol. 7, Issue 1, Feb. 2022, pp. 75-83.

Klebanoff, "The Zero-V: Feasibility of a Liquid Hydrogen Fueled Coastal Research Vessel", ICCT Technical Workshop on Zero Emission Vessel Technology, San Francisco, CA, Jul. 9, 2019, pp. 1-19.

Tchouvelev, et al., "Determination of Clearance Distances for Venting of Hydrogen Storage", Retrieved at <<https://h2tools.org/sites/default/files/2019-09/410093.pdf>>, Retrieval Date: May 25, 2022, pp. 1-12.

* cited by examiner

FLOW ASSIST VENT MAST

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

TECHNICAL FIELD

The aspects described herein relate generally to venting systems and Vent Masts for liquid or gas storage systems, and more particularly to venting systems and Vent Masts for liquid or gas storage systems used on boats and ships.

BACKGROUND

Substances that are gaseous at ambient temperatures—e.g., hydrogen, nitrogen, oxygen, carbon dioxide, and the like—can be stored and transported in a liquid state in cryogenic storage vessels, or alternatively such gases can be stored or transported at high pressure. Both liquefaction and compression to high pressure increases the volumetric storage density for more efficient transport and storage. The stored substances may be subjected to environmental factors that result in increased pressure of the substances in the storage vessels, such as cryogenic storage vessels being warmed by ambient temperature of the environment, or high-pressure storage subjected to a fire. To prevent overpressurization and possible rupture of the storage vessel, a portion of the gas needs to be vented from time to time, or in the case of a fire threat, most of the gas would need to be vented in this non-routine event. Flammable or otherwise potentially harmful gasses are vented via a tall Vent Mast so that the venting event occurs at a suitable distance from sources of ignition (in the case of a flammable gas) and from people. For example, some regulations require that there be no sources of ignition (e.g., people or equipment) within a sphere having a ten-meter radius and centered on the opening of the Vent Mast; effectively, then, to comply with the regulation, the Vent Mast must be (at least) 10 meters above ground or above a deck if on-board a vessel. When lighter-than-air gases are used on ships, for example, as part of a hydrogen-powered fuel cell propulsion system, a Vent Mast built to the required safety height can be quite high in comparison to the size of the ship on which it is attached. When the height of the mast is combined with the metal construction of typical Vent Masts, the Vent Mast can disrupt the vertical position of the center of gravity of the ship, thereby detracting from the stability of the ship.

It has been ascertained via computational fluid dynamics (CFD) analysis that in some cases flammable gases (such as hydrogen) can be moved readily by crosswinds due to light weight of the flammable gases (e.g., hydrogen, methane) relative to the air. For example, as can be seen in FIG. 1, a low-velocity hydrogen release exiting a Vent Mast is blown substantially horizontally by a crosswind to create a flammable region—i.e., a region with a concentration of hydrogen in the range 4-75%, that extends about 35 feet or 10.5 meters horizontally. Because the exit velocities of the hydrogen from the Vent Mast are low (in the example illustrated in FIG. 1), and the vented gas itself is lighter than air, the flow tends to be dominated by the momentum of the wind.

Consequently, the light-weight hydrogen molecules are blown horizontally along with the crosswind composed of the heavier components of air (i.e., nitrogen, oxygen). In the event of a downdraft, it is possible that the flammable gasses may be blown in a downward direction toward the boat and toward a potential source of ignition or people.

SUMMARY

The following is a brief summary of subject matter that is described in greater detail herein. This summary is not intended to be limiting as to the scope of the claims.

Vent Masts described herein can take advantage of the low momentum of the hydrogen flow (or other lightweight gas flow) at low velocity to control the direction of the gas exiting the Vent Mast so that the flammable gasses are directed further away from the storage vessel (and thus further away from a watercraft that includes the Vent Mast) and to relatively rapidly dilute the vent gas to inhibit the concentration of the gas from exceeding a flammability threshold, e.g., 4% hydrogen.

A venting system in accordance with features described herein includes a vent valve in an opening of a storage tank, a carrier gas source for supplying a carrier gas (a nonflammable, nontoxic gas such as air), and a Vent Mast that has a Vent Mast outlet. The Vent Mast has a vent tube and a carrier gas tube. The vent tube extends from a proximal end connected to an outlet of the vent valve to a distal end in the Vent Mast outlet. The carrier gas tube extends from a proximal end connected to the carrier gas source to a distal end in the Vent Mast outlet. Vent gas flows through a vent gas lumen formed by the vent tube and carrier gas flows through a carrier gas lumen formed by the carrier gas tube.

A method of operating a venting system for a gas storage system includes steps of opening a vent valve to allow a vent gas to exit from an opening in a gas storage tank, supplying carrier gas from a carrier gas source to a carrier gas tube, closing the vent valve to stop venting vent gas from the storage tank; and stopping the supply of carrier gas from the carrier gas source.

A method of manufacturing a venting system for a gas storage system includes steps of procuring a Vent Mast, arranging the Vent Mast such that a Vent Mast outlet is a desired distance from potential sources of ignition, connecting a proximal end of the vent tube to an outlet of a vent valve of a storage tank, and connecting a proximal end of the carrier gas tube to a carrier gas source. The Vent Mast includes a vent tube, a carrier gas tube, and the Vent Mast outlet. The Vent Mast outlet includes a distal end of the vent tube and a distal end of the carrier gas tube.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
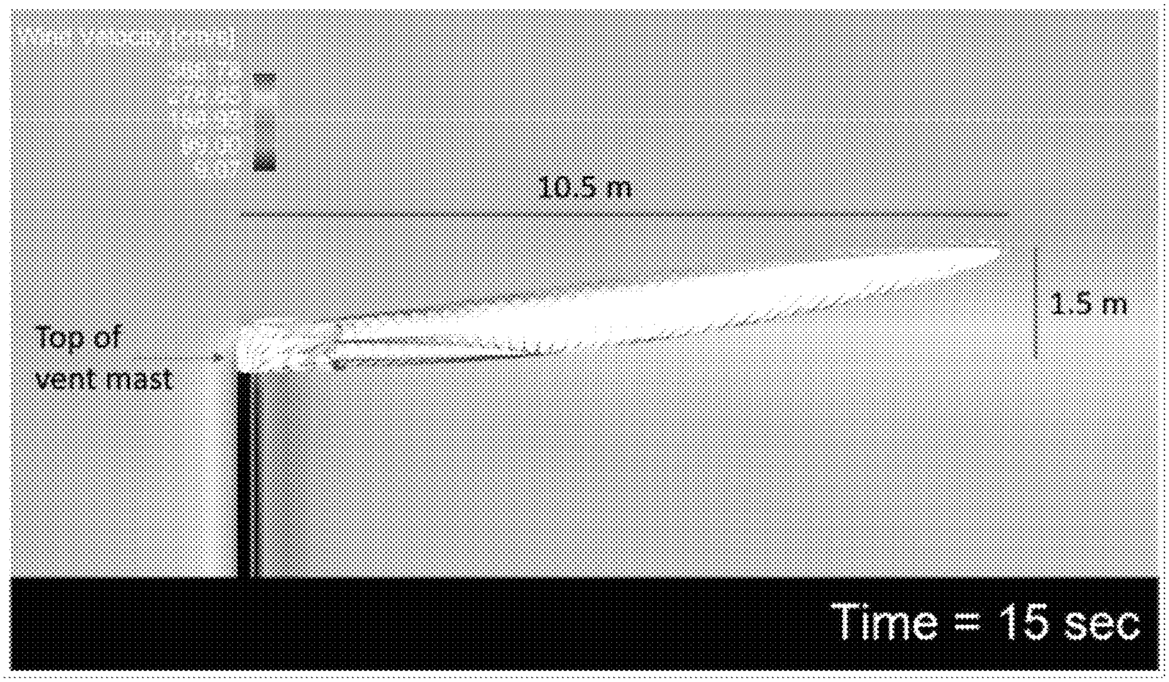
FIG. 1 (Prior Art)
FIG. 1 shows the results of CFD analysis of hydrogen venting from a prior art Vent Mast into a crosswind, where the flammable component of the venting, with concentration in the range 4-75%, is shown in white.

Various technologies pertaining to a venting system that is configured to vent, for example, cryogenically stored hydrogen from a storage tank are described herein, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members, or elements. Also as described herein, the terms "substantially" and "about" are defined as at least close to (and includes) a given value or state (preferably within 10% of, more preferably within 1% of, and most preferably within 0.1% of).

Figure 2:
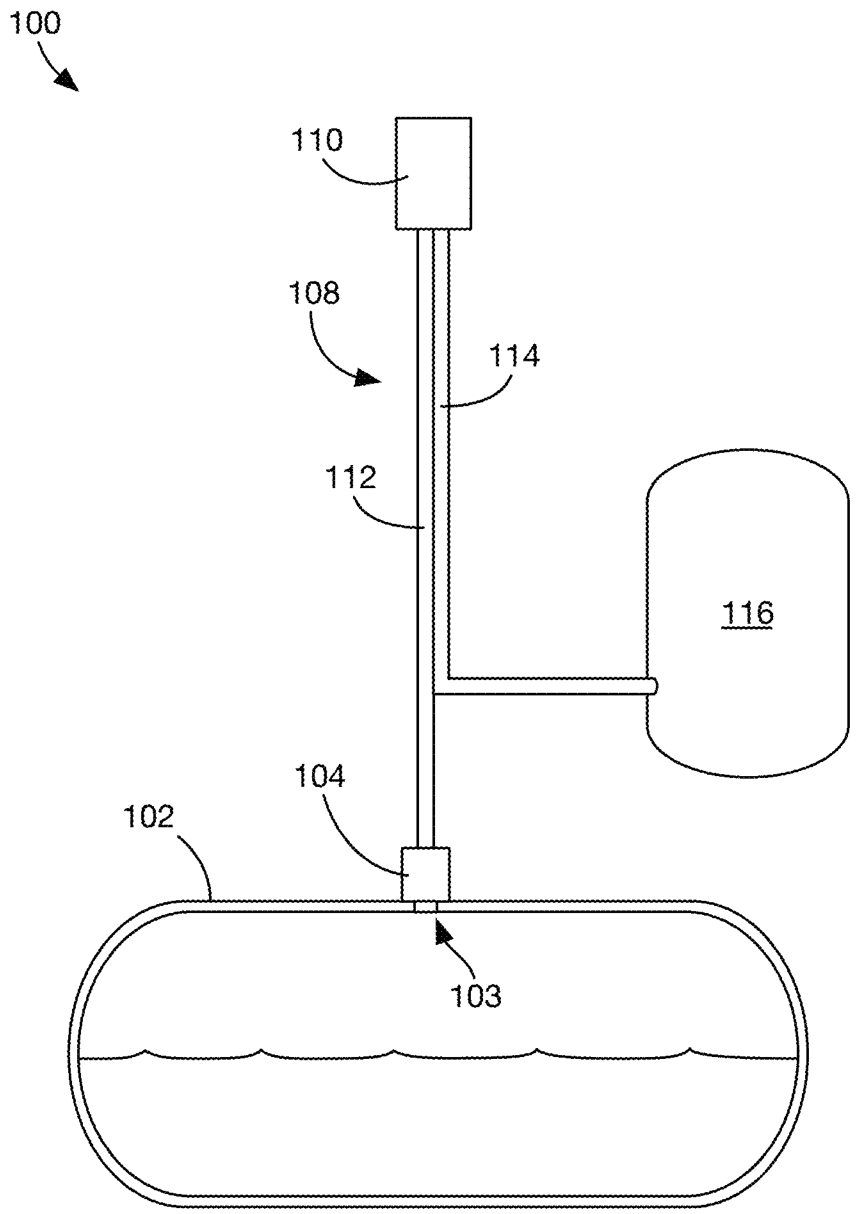
FIG. 2 is a schematic view of a venting system, for the example case of a cryogenic liquid being stored.

Referring now to FIG. 2, an example of a venting system 100 is shown. The venting system 100 includes a storage tank 102 that stores a substance, such as hydrogen, in liquid form. In another example, the storage tank 102 can store a gas having relatively high pressure in the storage tank. Further, the storage tank 102 can store hydrogen for use by a hydrogen fuel cell or a gas or liquid fuel for an internal combustion engine. The storage tank 102 includes an opening 103 and a vent valve 104 positioned in the opening 103. The vent valve 104 has an outlet through which the stored substance can be released from the storage tank 102 in gaseous form.

The venting system 100 also includes a Vent Mast 108 that extends from the vent valve 104 to a Vent Mast outlet 110. The Vent Mast 108 has a vent tube 112 and a carrier gas tube 114. The vent tube 112 extends from a proximal end that is fluidly connected to the outlet of the vent valve 104 to a distal end that is included in the Vent Mast outlet 110. The Vent Mast 108 extends from the vent valve 104 so that the Vent Mast outlet 110 is vertically displaced a distance above the vent valve 104 (and optionally horizontally displaced from the vent valve 104). The distance of the vertical displacement of the Vent Mast outlet 110 can be between 2 and 4 meters, between 2 and 6 meters, between 2 and 8 meters, between 2 and 10 meters, between 2 and 15 meters, and so on, depending on the location of the storage tank 104 relative to the locations of potential sources of ignition on the ship, or the location of people. The Vent Mast outlet 110 is also positioned a required distance from any source of ignition, where the required distance can be about 10 meters, about 8 meters, about 6 meters, about 4 meters, about 2 meters, and so on. One particular Vent Mast can have a Vent Mast outlet at about 4 to about 6 meters from any source of ignition while the distance required by existing regulations is about 10 meters, because current Vent Masts have no active means to dilute the vent gas, or drive the vent gas up and away from ignition sources or people, as provided by the Flow Assist Vent Mast described herein. The vent tube 112 and/or the gas carrier tube 114 can be formed of any suitable material, including metal (e.g., stainless steel, aluminum, titanium, etc.) and/or plastic (e.g., Acrylonitrile Butadiene Styrene, high density Polyethylene, Polycarbonate, Polyvinyl Chloride, etc.), such that there is basic material compatibility between the material of Vent Mast construction and the gas being vented.

The carrier gas tube 114 extends from a proximal end that is in fluid communication with a carrier gas source 116 to a distal end that is included in the Vent Mast outlet 110. The carrier gas tube 114 can extend in parallel with at least part of the vent tube 112 from a distal end of the vent tube 112 vertically downwards (and optionally horizontally in a suitable direction) toward the storage tank 102. In an example, the carrier gas tube 114 is concentric with the vent tube 112 at the distal ends of the vent tube 112 and the carrier gas tube 114 and continues to be concentric with the vent tube 112 along the length of the vent tube 112 until the proximal end of the vent tube 112. The vent tube 112 and/or the carrier gas tube 114 can have a circular cross-section, an ovular cross-section, a triangular cross-section, a square cross-section, a rectangular cross-section, a pentagonal cross-section, a hexagonal cross-section, and so forth.

The Vent Mast outlet 110 can be configured to allow for gases to exit the vent tube 112 and/or the carrier tube 114 while prohibiting or limiting, for example, rain from entering the vent tube 112 and/or carrier tube. This can be achieved by the addition of one or more covers above the Vent Mast outlet 110 that do not restrict the gas flow of the vent gas and carrier gas or by providing a rain trap—e.g., a series of bends that form a localized low point for collecting liquid-along the length of the Vent Mast 108 that is associated with a drain for draining any rain or other undesirable material that has entered the Vent Mast outlet 110. The Vent Mast 108 can optionally include two, three, four, or more outlets, each outlet of the Vent Mast 108 including the vent tube 112 and the carrier tube 114.

The carrier gas source 116 is in fluid communication with the proximal end of the carrier gas tube 114, wherein the carrier gas source 116 is configured to supply carrier gas to the carrier gas tube 114. The carrier gas source 116 can take on a wide variety of forms, such as, for example: a pressure vessel, e.g., a tank filled with a compressed carrier gas like nitrogen or compressed air; a fan, blower, or compressor that draws in air from the atmosphere and blows the air through the carrier gas tube 114, or the like. While not illustrated in FIG. 2, an optional fan or blower can also be included along the carrier gas tube 114 to provide additional motive force for directing the carrier gas from the carrier gas source 116 to the Vent Mast outlet 110.

In an example embodiment, a ship includes the venting system 100, where the ship is powered at least partially by a liquified natural gas. Example ships include oil tankers, ferries, cruise ships, yachts, and so forth.

Operation of the venting system 100 is now set forth. During a venting operation, the vent valve 104 is opened to release gas into the vent tube 112. The vent valve 104 can be manually opened or can be actuated via an automated system based on a condition or set of conditions. For example, the vent valve 104 can be actuated based upon a pressure reading from a pressure sensor in the storage tank 102, based upon the passage of a predetermined amount of time, as part of a maintenance routine, or the like. When the vent valve 104 is opened, gas in the storage container 102 flows through the vent valve 104 and into the vent tube 112 of the Vent Mast 108, where pressure and/or buoyancy of the gas causes the gas to flow vertically upwards in the vent tube 112 until the gas exits the vent tube 112 by way of the Vent Mast outlet 110.

Prior to or shortly after the opening of the vent valve 104, the carrier gas is supplied by the carrier gas source 116 to the carrier gas tube 114; as noted above, the carrier gas source 116 provides a pressure differential that directs the carrier gas from the proximal end of the carrier gas tube 114 to the distal end of the carrier gas tube 114 and out of the Vent Mast outlet 110 at the same time and/or shortly before the exiting of the vented gas from the Vent Mast outlet 110. The carrier gas flowing out of the carrier gas tube 114 mixes with and guides the gas exiting from the vent tube 112 upward and away from the Vent Mast outlet 110 as described above.

Figure 3:
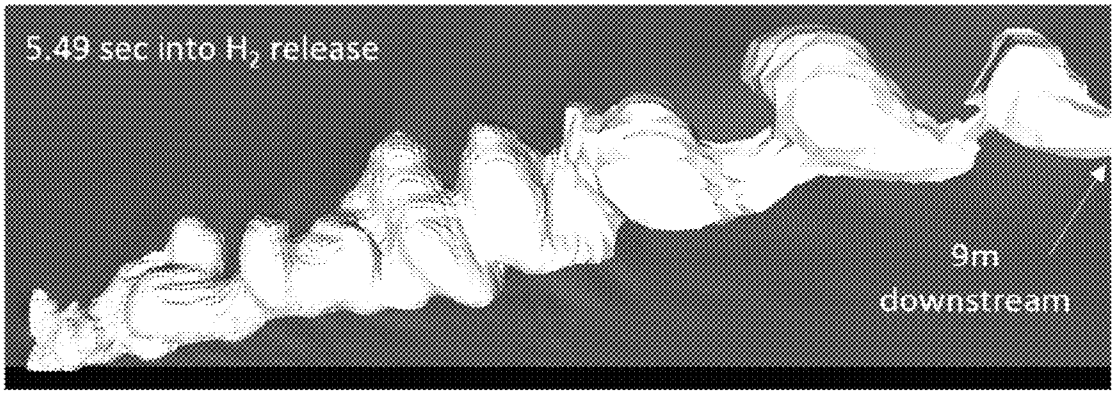
FIG. 3 shows the results of CFD analysis of hydrogen venting without a carrier gas flow, where the flammable component of the venting, with concentration in the range 4-75%, is shown in white.
Figure 4:
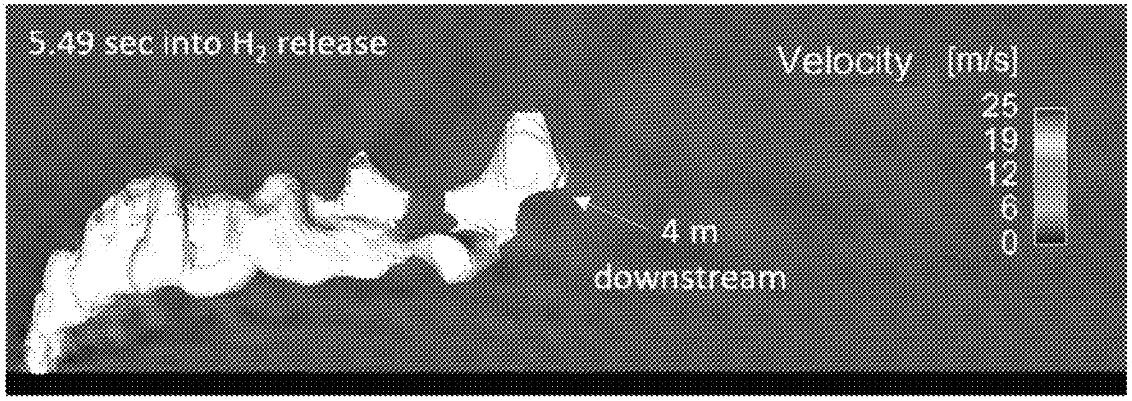
FIG. 4 shows the results of CFD analysis of hydrogen venting with a carrier gas flow, where the flammable component of the venting, with concentration in the range 4-75%, is shown in white.
Figure 5:
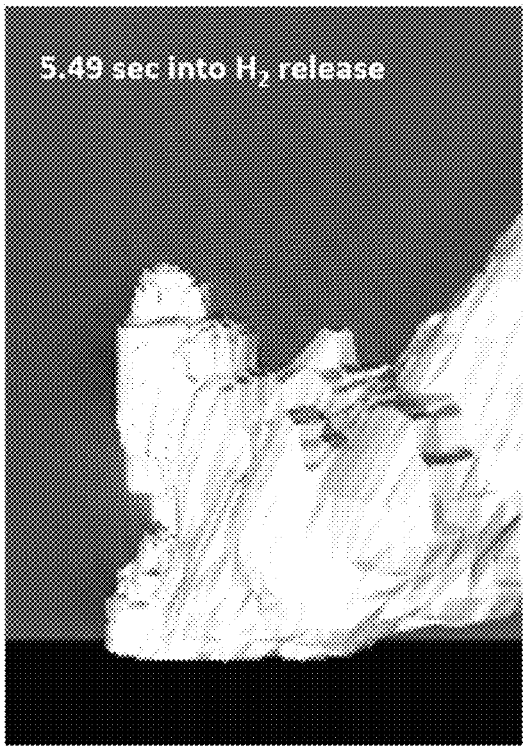
FIG. 5 shows the results of CFD analysis of hydrogen venting without a carrier gas flow with a focus on the Vent Mast exit, where the flammable component of the venting, with concentration in the range 4-75%, is shown in white.
Figure 6:
FIG. 6 shows the results of CFD analysis of hydrogen venting with a carrier gas flow with a focus on the Vent Mast exit, where the flammable component of the venting, with concentration in the range 4-75%, is shown in white.

Referring now to FIGS. 3-6, CFD analysis of hydrogen venting from the venting system 100 is shown. As was the case in FIG. 1, a concentration of hydrogen in the flammable range 4-75% is shown. FIGS. 3 and 5 show a prediction of the movement of the hydrogen gas vented with a flow velocity of about 30 mph into an approximately 6 mph crosswind and with no carrier gas flow. FIGS. 4 and 6 show the same venting conditions with an added carrier gas flow having a flow velocity of about 30 mph. As can be seen in FIG. 4, the flammable region extends only 4 meters downstream when the carrier gas flow is introduced, a greater than 50% reduction in range as compared to the 9-meter downstream prediction shown in FIG. 3. FIGS. 5 (no carrier gas flow) and 6 (with carrier gas flow) examine the region just above the Vent Mast outlet 110 and illustrates that the introduction of the carrier gas flow constrains the hydrogen gas to a smaller lateral area and moves the hydrogen gas immediately upward after leaving the Vent Mast outlet 110.

Figure 7:
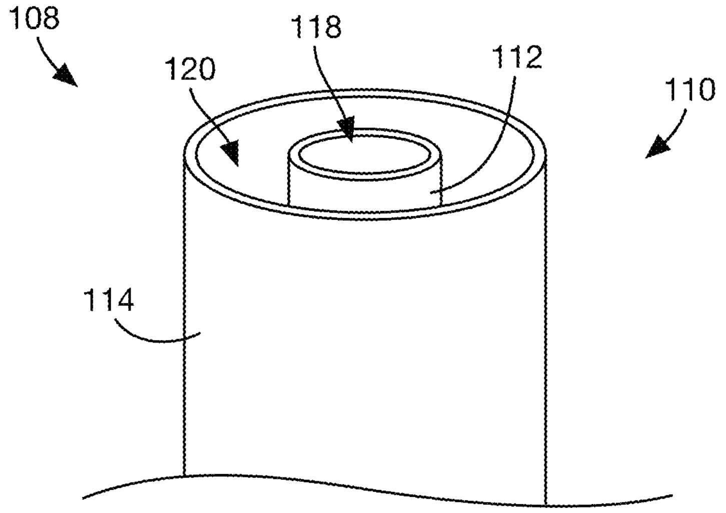
FIGS. 7-14 illustrate various examples of configurations of Vent Mast outlets.
Figure 8:
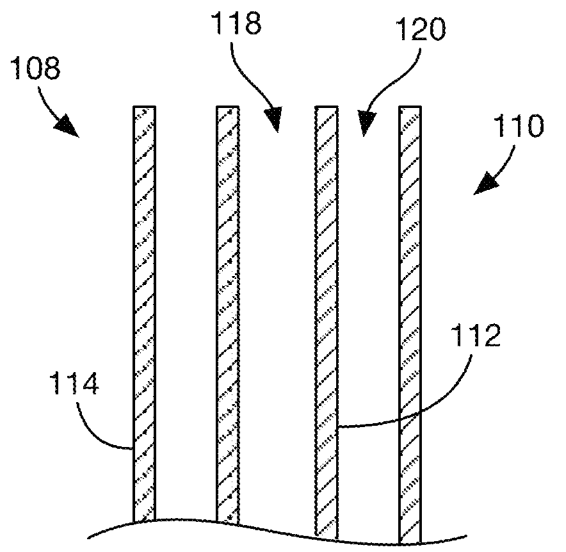

Referring now to FIGS. 7-14, examples of configurations of the vent tube 112 and the carrier gas tube 114 at the distal ends of such tubes are shown. FIG. 7 is a perspective view of the vent tube 112 and the carrier gas tube 114 arranged concentrically. The vented gas flows through a vent lumen 118 of the vent tube 112 and the carrier gas flows through an annular carrier gas lumen 120 formed between the vent tube 112 and the carrier gas tube 114. In the embodiment shown in FIG. 7, the distal ends of the vent tube 112 and the carrier gas tube 114 are coplanar along a plane that is orthogonal to a center axis of the vent tube 112 and the carrier tube 114. Accordingly, the vent gas and the carrier gas exit the Vent Mast outlet 110 to atmosphere at the same vertical height. The CFD analysis shown in FIGS. 3-6 is based on a simulation of the configuration shown in FIG. 7, with the vent tube 112 having an about 7-inch diameter and the carrier gas tube 114 having an about 9-inch diameter. FIG. 8 is a cross-section view of the Vent Mast outlet 110 of FIG. 7 that clearly shows that the distal ends of the vent tube 112 and the carrier tube 114 are coplanar along a plane that is orthogonal to a center axis of such tubes 112 and 114.

Referring now to FIGS. 9-14, cross-section views of various other embodiments of the distal ends of the vent tube 112 and the carrier gas tube 114 are shown to illustrate the wide variety of ways that the Vent Mast 108 can be structured. Vent Masts can incorporate one or more of the features of the Vent Masts shown in FIGS. 7-14 and are not limited to the combinations illustrated herein. It should also be noted that the relative size and shape of the components of the Vent Masts can be tailored to achieve a desired outlet condition. Similarly, the types, pressures, and flow rates of the gasses being vented or used as carrier gasses can be varied to achieve the desired result.

Figure 9:
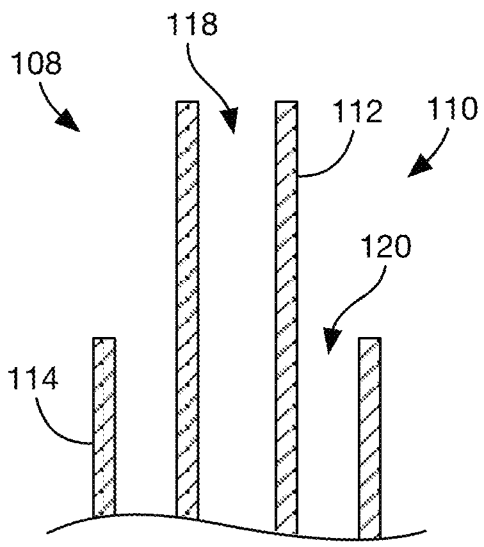
Figure 10:
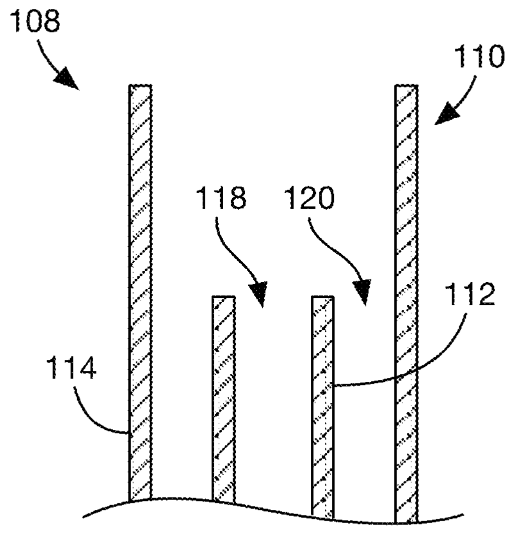
Figure 11:
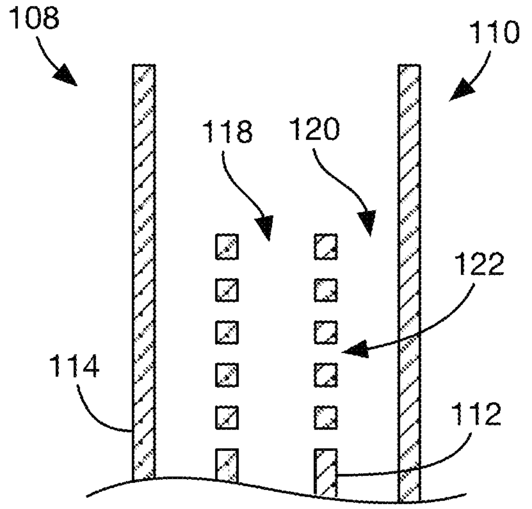

FIG. 9 shows a cross-section view of the Vent Mast 108 at the distal ends of the vent tube 112 and the carrier gas tube 114, with the carrier gas tube 114 terminating at a height that is lower than a height of the vent tube 112. FIG. 10 shows an embodiment where the carrier gas tube 114 terminates at a height that is greater than a height of the vent tube 112. Arranging the vent tube 112 to end within the carrier gas tube 114 may facilitate mixing of the vent and carrier gasses prior to exiting the Vent Mast outlet 110, thereby reducing the concentration of the vent gas prior to exiting the Vent Mast outlet 110. The embodiment shown in FIG. 11 is similar to the embodiment shown in FIG. 10 and includes mixing holes 122 formed in the vent tube 112 to further facilitate the mixing of the vent and carrier gasses to dilute the vent gas prior to exit from the vent gas outlet 110.

Figure 12:
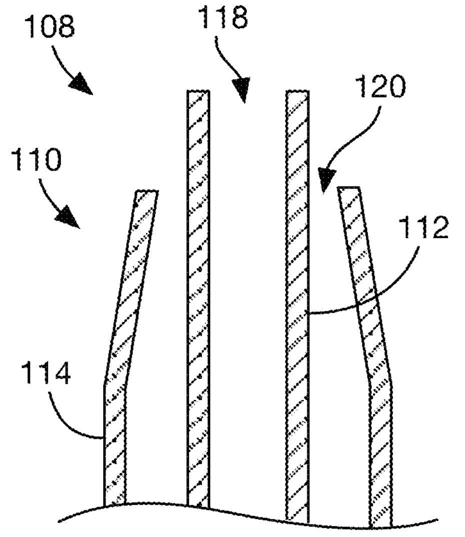
Figure 13:
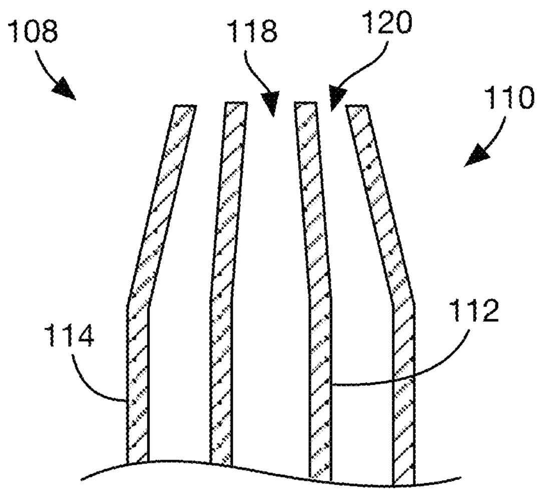

FIG. 12 and FIG. 13 illustrate embodiments of the Vent Mast 108 with the carrier gas tube 114 (FIG. 12) or both the vent tube 112 and carrier gas tube 114 (FIG. 13) having a tapered shape. The taper in the carrier gas tube 114 of FIG. 12 reduces the area of the carrier gas lumen 120 to cause the carrier gas to accelerate and exit the carrier gas lumen 120 at a higher flow velocity without increasing the pressure of the carrier gas generated by the carrier gas source 116. The vent tube 112 is tapered in the embodiment shown in FIG. 13 to cause an acceleration of the vent gas. When the vent tube 112 is tapered, the flow velocity of the carrier gas exiting the carrier gas tube 114 depends on the shape of the carrier gas tube 114 relative to the vent gas tube 112. That is, the carrier gas tube 114 can be tapered to maintain a constant cross-sectional area of the carrier gas lumen 120 as the vent tube 112 tapers so that the carrier gas maintains the same flow velocity as when both the vent tube 112 and carrier gas tube 114 are straight (FIG. 7). The carrier gas tube 114 can also be tapered such that the cross-sectional area of the carrier gas lumen 120 increases to cause a reduction in flow velocity or decreases to cause an increase in flow velocity. Further, while not illustrated, the vent tube 112 can be tapered outwards (towards the carrier gas tube 114), thereby reducing exit velocity of the vent gas. Combinations of tapers are also contemplated (e.g., the carrier gas tube 114 tapered inwardly with the vent tube 112 tapered outwardly, both the carrier gas tube 114 and the vent tube 112 tapered outwardly, etc.).

Figure 14:
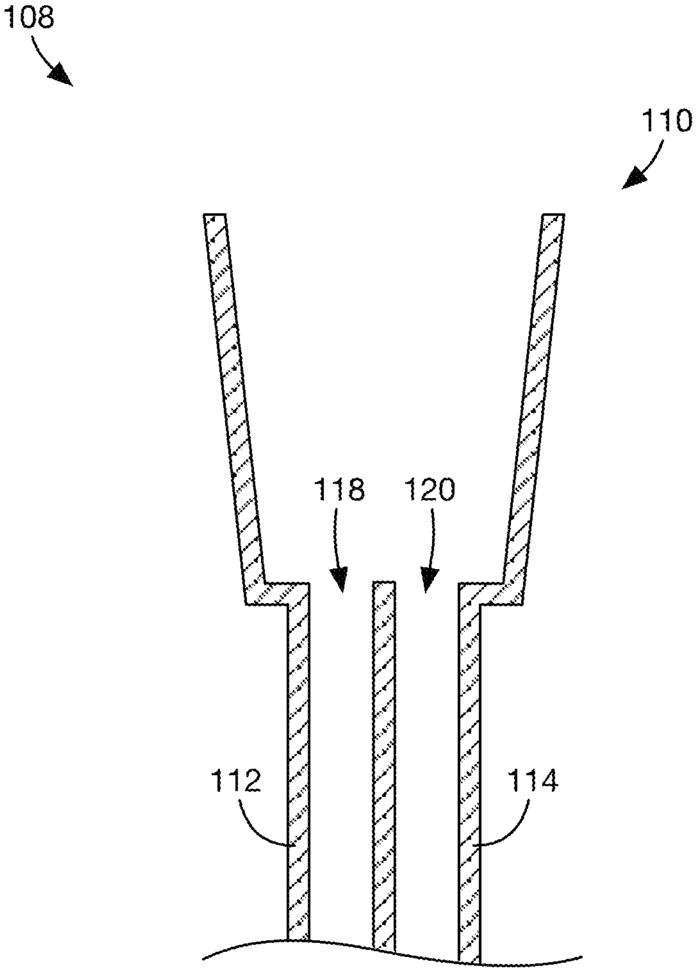

FIG. 14 illustrates an embodiment of the Vent Mast 108 with the vent tube 112 and the carrier gas tube 114 arranged side-by-side with distal ends terminating in the bottom of a cup-shaped vent mast outlet 110. The cup-shaped vent mast outlet 110 provides a region of the Vent Mast 108 that is shielded from the atmosphere and that may facilitate mixing of the vent and carrier gasses prior to exiting the Vent Mast outlet 110, thereby reducing the concentration of the vent gas prior to exiting the Vent Mast outlet 110. The cup-shaped Vent Mast outlet 110 can have any suitable shape or be any suitable size or length that provides a mixing area for the vent gas and carrier gas. In an alternative embodiment, the vent tube 112 and the carrier gas tube 114 may be concentric and may terminate at the base of the cup-shaped Vent Mast outlet 110.

Figure 15:
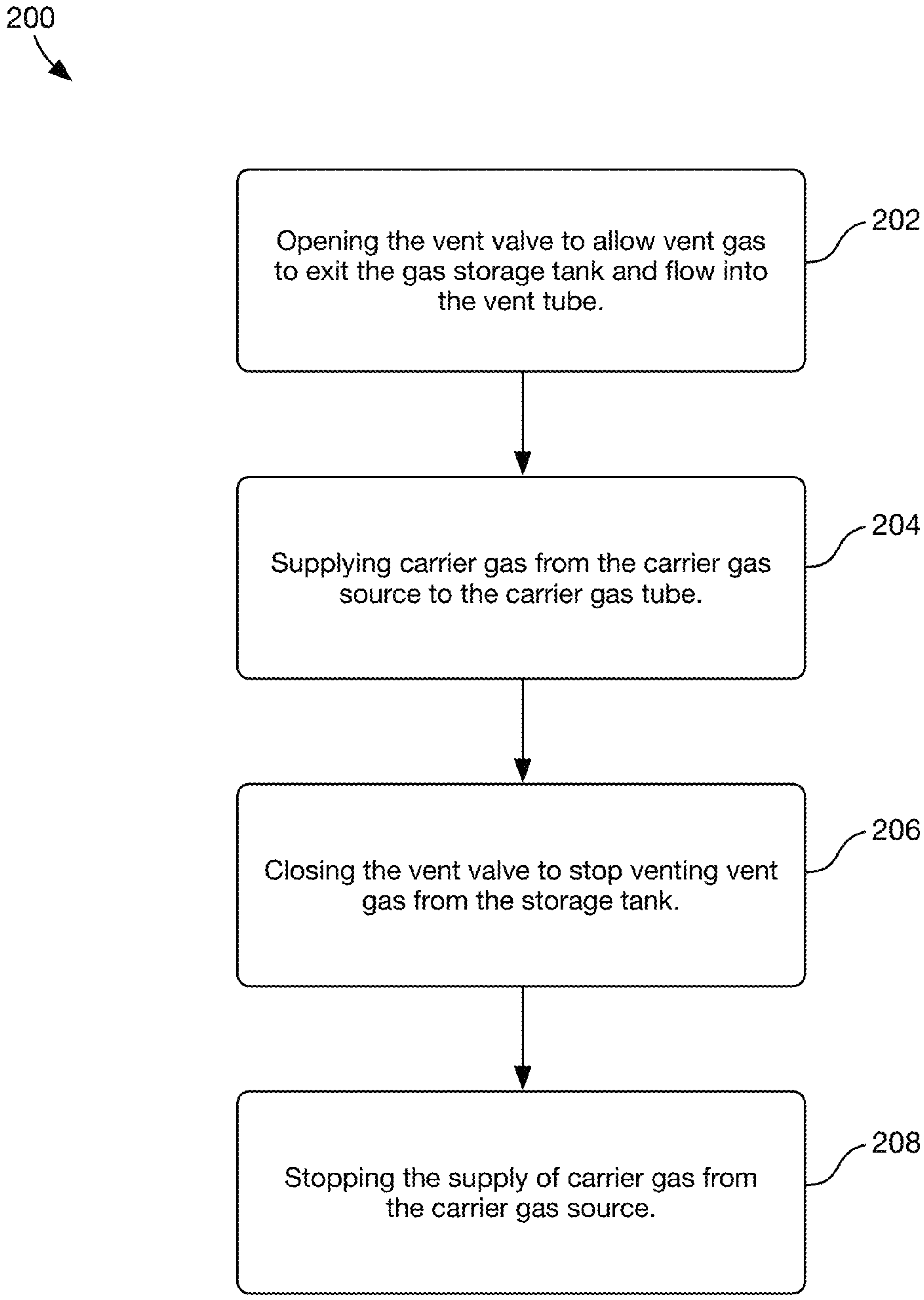
FIG. 15 is a diagram showing the steps of an example of a method of operating a venting system.
Figure 16:
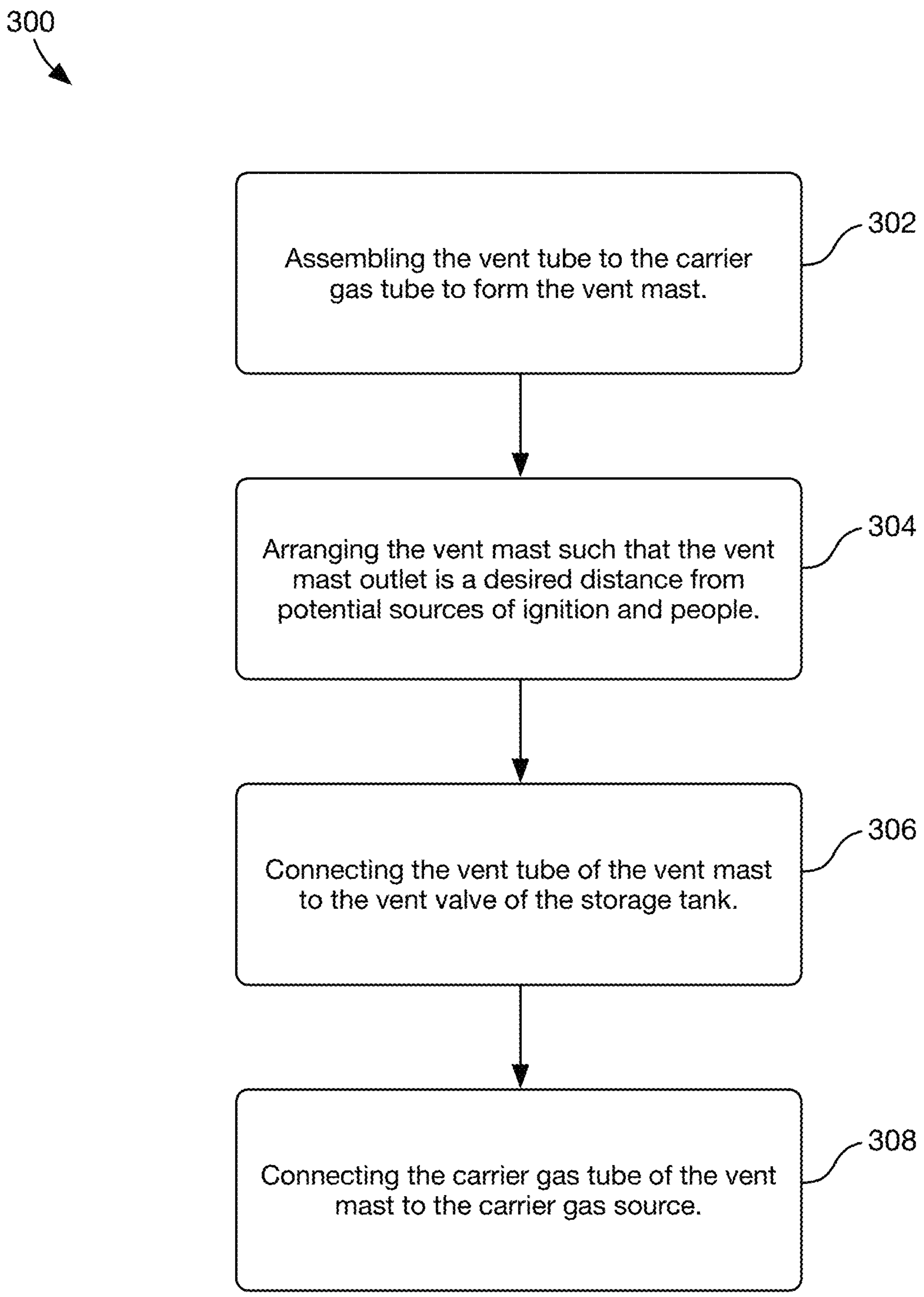
FIG. 16 is a diagram showing the steps of an example of a method of manufacturing a venting system.

FIGS. 15 and 16 illustrate methodologies relating to making and using a venting system for venting, for example, hydrogen from a cryogenic or high-pressure storage tank. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Referring now solely to FIG. 15, a diagram illustrating a method of operating 200 a venting system, such as the venting system 100 described herein, is shown. The vent valve 104 is opened in step 202 to allow vent gas to exit the storage tank 102 and flow into the vent tube 112 of the Vent Mast 110. In step 204, carrier gas is supplied to the carrier gas tube 114 of the Vent Mast 110 from the carrier gas source 116 and can optionally continue to be supplied while the vent valve 104 remains open. Step 204 can be performed before, simultaneous with, or after step 202 so that carrier gas is provided at the Vent Mast outlet 110 at the same time as the vent gas. In an example, the carrier gas can be provided continuously (e.g., there is constantly carrier gas being suppled through the carrier gas tube 114). The timing of step 204 relative to step 202 depends on the pressure, flow rate, diameter of the vent tube 112 and the carrier gas tube 114, and the desired amount of carrier gas present at the Vent Mast outlet 110 relative to the amount of vent gas.

For example, it may be advantageous to establish a carrier gas flow from the Vent Mast outlet 110 in step 204 for 10 seconds, or 30 seconds, one minute, or longer prior to opening the vent valve 104 in step 202. The amount of vent gas vented from the Vent Mast 108 can be calculated based on mass flow data, pressure data, temperature data, and duration data gathered during step 202. Once the desired amount of vent gas has been released, in step 206, the vent valve 104 is closed to stop venting vent gas from the storage tank 102. The carrier gas flow is also stopped in step 208, which can be performed before, simultaneous with, or after step 206. In one method of operating the venting system 100, the carrier gas flow is maintained until a predetermined time after the vent gas stops flowing so that any residual vent gasses are diluted and carried away from the Vent Mast outlet 110.

Referring now to FIG. 16, a diagram illustrating a method of manufacturing 300 a venting system, such as the venting system 100 described herein, is shown. In an example method of manufacturing the venting system 100, the vent tube 112 is assembled to the carrier gas tube 114 to form the Vent Mast 108 in step 302. The assembled Vent Mast 108 is arranged in step 304 such that the Vent Mast outlet 110 is at a desired distance from potential sources of ignition or people. In step 306, the vent tube is connected to the vent valve of the storage tank and the carrier gas tube is connected to the carrier gas source in step 308.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A venting system for venting gas from a storage tank, the venting system comprising:
- a vent valve configured to connect to an opening in the storage tank, wherein the vent valve has an outlet, and further wherein the storage tank is configured to store the gas;
- a carrier gas source configured to supply a carrier gas, wherein the gas is different than the carrier gas; and
- a Vent Mast extending to a Vent Mast outlet, the Vent Mast comprising:
  - a vent tube extending from a proximal end that is fluidly connected to the outlet of the vent valve to a distal end in the Vent Mast outlet, the vent tube forming a vent lumen through which the gas from the storage tank flows; and
  - a carrier gas tube extending from a proximal end that is fluidly connected to the carrier gas source to a distal end in the Vent Mast outlet, the carrier gas tube forming a carrier gas lumen through which a carrier gas from the carrier gas source flows, and wherein at least a portion of the carrier gas tube extends parallel to and concentric to the vent gas tube.

2. The venting system of claim 1, wherein the distal end of the vent tube is coplanar with the distal end of the carrier gas tube on a plane that is orthogonal to a center axis of the vent tube.

3. The venting system of claim 1, wherein the vent tube is concentrically arranged inside of the carrier gas tube.

4. The venting system of claim 1, wherein the Vent Mast outlet is arranged a distance from the vent valve in a range between about 2 meters and about 8 meters.

5. The venting system of claim 1, wherein the carrier gas source comprises at least one of a fan or a blower.

6. The venting system of claim 1, wherein the carrier gas source is a pressure vessel, a fan, a blower, or a compressor.

7. A method for venting a flammable gas from a storage tank, the method comprising:

opening a vent valve to allow the flammable gas to exit from an opening in the storage tank and through a vent tube that is fluidly connected to the storage tank;

supplying a non-flammable carrier gas from a carrier gas source to a carrier gas tube, wherein at least a portion of the carrier gas tube is arranged in parallel and concentric with at least a portion of the vent tube, and further wherein the non-flammable carrier gas mixes with and guides the flammable gas away from an opening of the vent tube; and closing the vent valve to stop venting the flammable gas from the storage tank.

8. The method of claim 7, wherein supplying the non-flammable carrier gas begins prior to the step of opening the vent valve and continues while the vent valve remains open.

9. The method of claim 7, wherein the at least portion of the carrier gas tube concentrically surrounds the at least portion of the vent tube.

10. The method of claim 7, the carrier gas source is a pressure vessel, a fan, a blower, or a compressor.

11. A method of manufacturing a venting system for venting gas from a storage tank, the method comprising:

providing a Vent Mast comprising a vent tube, a carrier gas tube, and a Vent Mast outlet, the Vent Mast outlet comprising a distal end of the vent tube and a distal end of the carrier gas tube, wherein at least a portion of the carrier gas tube concentrically surrounds and extends parallel to at least a portion of the vent tube;

connecting a proximal end of the vent tube to an outlet of a vent valve of the storage tank such that the gas in the storage tank is able to exit the storage tank and flow through the vent tube; and connecting a proximal end of the carrier gas tube to a carrier gas source such that carrier gas is able to flow through the carrier gas tube in a same direction of flow as as the gas flows through the vent tube;

wherein the carrier gas source is distinct from the storage tank.

12. The method of claim 11, wherein a length of the vent tube is between 2 meters and 8 meters.

13. The method of claim 11, wherein the carrier gas is a non-flammable gas.

14. The method of claim 11, the carrier gas source is a pressure vessel, a fan, a blower, or a compressor.

* * * * *